(12) United States Patent
Bennett et al.

(10) Patent No.: US 6,699,955 B1
(45) Date of Patent: Mar. 2, 2004

(54) COPOLYMERIZATION OF ETHYLENE AND DIENES

(75) Inventors: Alison Margaret Anne Bennett, Wilmington, DE (US); Elizabeth Forrester McCord, Hockessin, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/712,673

(22) Filed: Nov. 14, 2000

Related U.S. Application Data

(60) Provisional application No. 60/166,416, filed on Nov. 19, 1999.

(51) Int. Cl.[7] .................................................. C08F 36/20
(52) U.S. Cl. ................ 526/336; 526/340.2; 526/340.3; 526/339; 526/308; 528/396
(58) Field of Search .................. 526/308, 336, 526/340.2, 340.3, 348.2, 348.3, 348.4

(56) References Cited

U.S. PATENT DOCUMENTS

| | | | | |
|---|---|---|---|---|
| 3,984,610 A | * | 10/1976 | Elston | ........................ 526/169 |
| 5,208,304 A | * | 5/1993 | Waymouth | ................... 526/164 |
| 5,260,389 A | * | 11/1993 | Resconi et al. | ............. 526/160 |
| 5,387,664 A | * | 2/1995 | Kawasaki et al. | ........... 526/336 |
| 5,395,906 A | * | 3/1995 | Marks et al. | ................ 526/308 |
| 5,476,903 A | * | 12/1995 | Shinozaki et al. | ........... 525/232 |
| 5,539,075 A | * | 7/1996 | Gustafsson et al. | ......... 526/339 |
| 5,578,743 A | * | 11/1996 | Ho et al. | ..................... 585/530 |
| 5,756,580 A | * | 5/1998 | Natori et al. | ................ 525/100 |
| 5,814,714 A | * | 9/1998 | Palomo et al. | .............. 526/336 |
| 5,922,823 A | * | 7/1999 | Sagane et al. | ............... 526/336 |

FOREIGN PATENT DOCUMENTS

| | | | | |
|---|---|---|---|---|
| EP | 219166 | * | 4/1987 | ......... C08F/210/18 |
| EP | 273655 | * | 7/1988 | ......... C08F/210/18 |
| JP | 7-41511 A | * | 2/1995 | ............. C08F/4/52 |
| WO | WO 95/06669 A1 | * | 3/1995 | ............. C08F/4/24 |

* cited by examiner

*Primary Examiner*—David W. Wu
*Assistant Examiner*—Rip A Lee

(57) ABSTRACT

Ethylene, dienes and optionally α-olefins are copolymerized by selected iron complexes of 2,6-pyridinecarboxaldehydebis(imines) and 2,6-diacylpyridinebis(imines). The resulting copolymers contain residual olefinic unsaturation from the diene monomers, and some of these copolymers contain cyclic units in the main chain.

8 Claims, No Drawings

COPOLYMERIZATION OF ETHYLENE AND DIENES

CROSS-REFERENCE TO RELATED APPLICATION

This application claims priority under 35 U.S.C. §119 from U.S. Provisional Application Ser. No. 60/166,416 (filed Nov. 19, 1999), which is incorporated by reference herein for all purposes as if fully set forth.

FIELD OF THE INVENTION

Ethylene and dienes, and optionally other olefins, can be copolymerized by using a polymerization catalyst which is a selected iron complex of a 2,6-pyridinecarboxaldehydebis(imine) or a 2,6-diacylpyridinebis(imine). The resulting copolymers contain branches with olefin groups, and in some instances cyclic structures resulting from cyclization of certain of the dienes.

TECHNICAL BACKGROUND

Ethylene and its copolymers are important items of commerce. The copolymerization of ethylene with alpha, omegadienes in many instances, such as with Ziegler-Natta and metallocene type catalysts, yields crosslinked polymers since both of the olefinic bonds in the diene may be polymerized by these catalysts. Indeed to make polyolefins (including polyethylenes) having branches containing olefinic bonds, nonconjugated external-internal diolefins such as 1,4-hexadiene (or other types of dienes having two olefinic groups of differing reactivities) must be used.

It has now been found that selected iron or cobalt complexes of a 2,6-pyridinecarboxaldehydebis(imines) or 2,6-diacylpyridinebis(imines) may be used to copolymerize ethylene and various dienes, and that the resulting copolymers contain branches having terminal olefin groups. In some instances part of the diene which is incorporated into the copolymer is present as a saturated cyclic structure which is part of the polymer main chain. U.S. Pat. No. 5,955,555, WO99/12981, WO99/46302, WO99/46303, WO99/46304, WO99/46308, WO99/50318 (corresponding to U.S. patent application Ser. No. 09/273,409, filed Mar. 22, 1999), WO99/62963 (corresponding to U.S. patent application Ser. No. 09/317,104, filed May 21, 1999), WO99/62967 (corresponding to U.S. patent application Ser. No. 09/317,563, filed May 21, 1999), WO00/15646, WO00/24788, WO00/32641 and WO00/50470 (all of which are incorporated by reference herein for all purposes as if fully set forth) describe the use of selected iron or cobalt complexes of a 2,6-pyridinecarboxaldehydebis(imine) or a 2,6-diacylpyridinebis(imine) as polymerization catalysts for ethylene and other olefins. No mention is made of the use of dienes as comonomers.

SUMMARY OF THE INVENTION

This invention concerns a process for preparing an olefin copolymer, comprising the step of contacting:

(a) a monomer component comprising ethylene and a diene of the formula $H_2C=CH(CH_2)_nCH=CHR^{19}$, wherein $R^{19}$ is hydrogen or an n-alkyl containing 1 to 18 carbon atoms, and n is 0 or an integer of 1 to 28; and (b) an active copolymerization catalyst, under conditions to copolymerize the monomers of the monomer component, wherein the active copolymerization catalyst comprises an iron complex of a tridentate ligand of the formula (I)

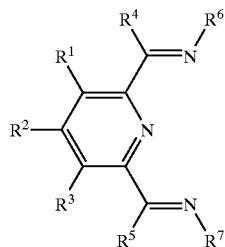

wherein:

$R^1$, $R^2$, $R^3$, $R^4$ and $R^5$ are each independently hydrogen, hydrocarbyl, substituted hydrocarbyl or an inert functional group, provided that any two of $R^1$, $R^2$ and $R^3$ vicinal to one another, taken together may form a ring; and $R^6$ and $R^7$ are each independently aryl or substituted aryl.

Optionally, the monomer mixture may further comprise, in addition to ethylene and the diene, one or more α-olefins of the formula $H_2C=CHR^{20}$, wherein $R^{20}$ is n-alkyl containing 1 to 18 carbon atoms.

This invention also concerns an olefin copolymer comprising the repeat units:

(a) $—CH_2CH_2—$ (II);

(b)

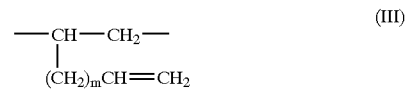

wherein m is 1, 2, 3 or 4; and (c) (1) when m is 2, 3 or 4, one or more of

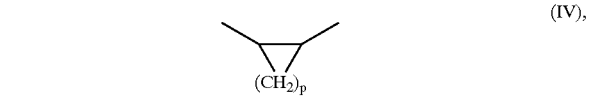

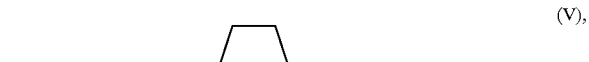

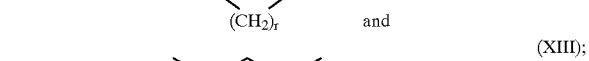

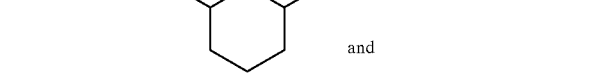

(2) when m is 1, one or more of (V) and (XIII);

wherein:

p is equal to m; and r is equal to one or more of m−1, m, and m+1.

This copolymer may be derived when the monomer component comprises ethylene and one or more dienes of the above formula wherein n is 1, 2, 3 or 4. In the event that the monomer mixture optionally contains one or more dienes wherein n is 0 (butadiene) or an integer of from 5 to 28, or one or more α-olefins of the above formula, the copolymer will further comprise the respective repeat units (XII) and (XIII)

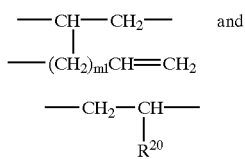

(XII)

(XIII)

wherein ml is 0 or an integer of from 5 to 28 (e.g., equal to n from the corresponding diene monomer), and $R^{20}$ is as defined above (equal to $R^{20}$ from the corresponding α-olefin monomer).

The copolymers resulting from the process in general contain at least some residual olefinic unsaturation derived from the diene monomer (see repeat units (III) and (XII)), but are preferably in and of themselves substantially non-crosslinked. Thus, the invention still further concerns a substantially non-crosslinked copolymer of ethylene and a diene of the formula $H_2C=CH(CH_2)_nCH=CHR^{19}$, wherein $R^{19}$ is hydrogen or an n-alkyl containing 1 to 18 carbon atoms, and n is 0 or an integer of 1 to 28, containing residual unsaturation derived from the diene monomer. Preferably this copolymer contains one or more of the repeat units

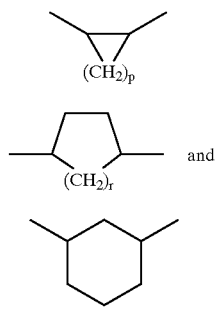

(IV), (V), (XIII)

wherein p is 2, 3 or 4; and r is 0, 1, 2, 3, 4, or 5.

The resulting copolymers are crosslinkable at least in part due to the presence of the residual olefinic unsaturation. This residual olefinic unsaturation may also be reacted with a variety of functional compounds to impart various types of functionality to the copolymer.

DETAILED DESCRIPTION OF THE PREFERRED EMBODIMENTS

Herein certain terms are used which are defined below.

A "hydrocarbyl group" is a univalent group containing only carbon and hydrogen. As examples of hydrocarbyls may be mentioned unsubstituted alkyls, cycloalkyls and aryls. If not otherwise stated, it is preferred that hydrocarbyl groups herein contain 1 to about 30 carbon atoms, and more preferably 1 to about 20 carbon atoms.

By "substituted hydrocarbyl" herein is meant a hydrocarbyl group that contains one or more substituent groups which are inert under the process conditions to which the compound containing these groups is subjected (e.g., an inert functional group, see below). The substituent groups also do not substantially detrimentally interfere with the polymerization process or operation of the polymerization catalyst system. If not otherwise stated, it is preferred that substituted hydrocarbyl groups herein contain 1 to about 30 carbon atoms. Included in the meaning of "substituted" are chains or rings containing one or more heteroatoms, such as nitrogen, oxygen and/or sulfur, and the free valence of the substituted hydrocarbyl may be to the heteroatom. In a substituted hydrocarbyl, all of the hydrogens may be substituted, as in trifluoromethyl.

By "inert functional group" herein is meant a group, other than hydrocarbyl or substituted hydrocarbyl, that is inert under the process conditions to which the compound containing the group is subjected (although under other conditions such functionality may not be inert). The inert functional groups also do not substantially interfere with any process described herein that the compound in which they are present may take part in. Examples of potential inert functional groups include halo, ester, keto (oxo), amino, imino, carboxyl, phosphite, phosphonite, phosphine, phosphinite, thioether, amide, nitrile and ether. Preferred inert functional groups are halo, ester, amino, imino, carboxyl, phosphite, phosphonite, phosphine, phosphinite, thioether and amide. Particularly preferred examples of inert functional groups include halo (fluoro, chloro, bromo and iodo) and ether such as —$OR^{60}$, wherein $R^{60}$ is hydrocarbyl or substituted hydrocarbyl. Which substitutents are useful in which polymerizations may in some cases be determined by reference to previously incorporated U.S. Pat. No. 5,955, 555, WO99/12981, WO99/46302, WO99/46303, WO99/ 46304, WO99/46308, WO99/50318, WO99/62963, WO99/ 62963, WO00/15646, WO00/24788, WO00/32641 and WO00/50470. In cases in which the inert functional group may be near the transitional metal (iron) atom of the catalyst, the inert functional group should not coordinate to the metal atom more strongly than the groups in those compounds are shown as coordinating to the metal atom, that is they should not displace the desired coordinating group.

By a "catalyst activator" is meant a compound that reacts with a transition metal (iron) compound to form an activated catalyst species. A preferred catalyst activator is an alkylaluminum compound.

By an "alkylaluminum compound" is meant a compound in which at least one alkyl group is bound to an aluminum atom. Other groups such as alkoxide, hydride and halogen may also be bound to aluminum atoms in the compound.

By "relatively noncoordinating" (or "weakly coordinating") anions are meant those anions as are generally referred to in the art in this manner, and the coordinating ability of such anions is known and has been discussed in the literature. See, for instance, W. Beck et al., *Chem. Rev.*, vol. 88, pp. 1405–1421 (1988), and S. H. Strauss, *Chem. Rev.*, vol. 93, pp. 927–942 (1993), both of which are hereby included by reference. Among such anions are those formed from aluminum compounds (such as those described in the immediately preceding paragraph) and $X^-$ (an anion as discussed in further detail below), including $(R^{19})_3AlX^-$, $(R^{19})_2AlClX^-$, $R^{19}AlCl_2X^-$, and $R^{19}AlOX^-$, wherein $R^{19}$ is alkyl. Other useful noncoordinating anions include BAF⁻ {BAF=tetrakis[3,5-bis(trifluoromethyl)phenyl]borate}, $SbF_6^-$, $PF_6^-$, and $BF_4^-$, trifluoromethanesulfonate, p-toluenesulfonate, $(R_fSO_2)_2N^-$ and $(C_6F_6)_4B^-$.

By "substantially non-crosslinked" is meant that at least 80 weight percent, and preferably at least 90 weight percent, of the polymer is soluble in a solvent that usually dissolves such polymer. For the polyolefins described herein, suitable solvents will often be a hydrocarbon or halogenated hydrocarbon solvent, such solution preferably being carried out above the melting point (if any) of the polyolefin.

By "aryl" is meant a monovalent aromatic group in which the free valence is to the carbon atom of an aromatic ring. An aryl may have one or more aromatic rings which may be fused, connected by single bonds or other groups.

By "substituted aryl" is meant a monovalent aromatic group substituted as set forth in the above definition of "substituted hydrocarbyl". Similar to an aryl, a substituted aryl may have one or more aromatic rings which may be fused, connected by single bonds or other groups; however, when the substituted aryl has a heteroaromatic ring, the free valence in the substituted aryl group can be to a heteroatom (such as nitrogen) of the heteroaromatic ring instead of a carbon.

The polymerization process described herein uses as an active polymerization catalyst an iron complex of (I). The same general conditions which are used to polymerize ethylene alone (as described in the previously incorporated references) may be used for the copolymerizations described herein, except of course a diene will also be present. The amount of diene incorporated into the copolymer that is formed will depend on the relative amounts of ethylene and diene in the polymerization process. Since ethylene is incorporated into the copolymer faster than the diene, as the amount of diene relative to the ethylene present in the polymerization process increases, the amount of diene incorporated into the copolymer will typically increase. For example, in a polymerization in which the diene is present with the catalyst in a liquid phase, and ethylene is fed to the polymerization as a gas, increasing the concentration of the diene in the liquid phase and/or decreasing the pressure of ethylene in the system will increase diene incorporation.

Compounds particularly useful as ligands for the iron catalyst complexes are diimines of 2,6-pyridinedicarboxaldehyde or 2,6-diacylpyridines of the general formula (I)

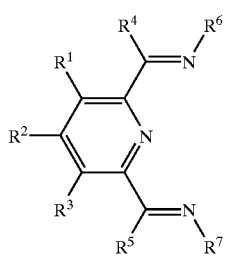

(I)

wherein each of $R^1$, $R^2$, $R^3$, $R^4$ and $R^5$ are independently hydrogen, hydrocarbyl, substituted hydrocarbyl or an inert functional group, provided that any two of $R^1$, $R^2$ and $R^3$ vicinal to one another, taken together may form a ring; and $R^6$ and $R^7$ are aryl or substituted aryl.

For ligand (I), preferred formulas and compounds (and for their Fe complexes also) are found in previously incorporated U.S. Pat. No. 5,955,555, WO99/12981, WO99/46302, WO99/46303, WO99/46304, WO99/46308, WO99/50318, WO99/62963, WO99/62967, WO00/15646, WO00/24788, WO00/32641 and WO00/50470, and preferred groupings and compounds in these publications are also preferred herein.

Particularly preferred is a ligand of the formula (VII)

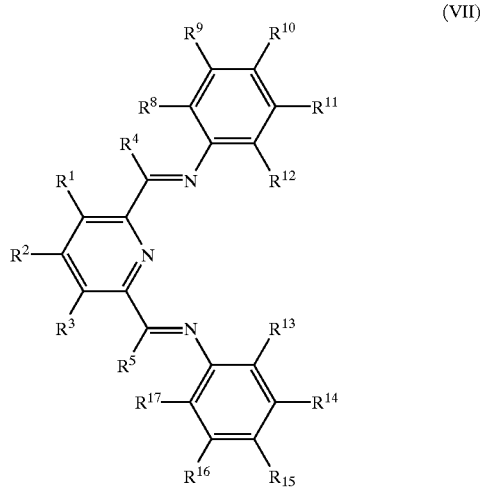

(VII)

In (VII), and hence in all complexes of (VII), it is preferred that:

$R^1$, $R^2$ and $R^3$ are hydrogen; and/or $R^1$ and $R^3$ are hydrogen, and $R^2$ is trifluoromethyl; and/or $R^9$, $R_{10}$, $R^{11}$, $R_{14}$, $R^{15}$ and $R^{16}$ are each independently halogen, alkyl containing 1 to 6 carbon atoms, or hydrogen, and it is more preferred that each of these is hydrogen; and/or $R^{10}$ and $R^{15}$ are methyl; and/or $R^8$ and $R^{13}$ are each independently halogen, phenyl or alkyl containing 1 to 6 carbon atoms, and it is especially preferred that each $R^8$ and $R^{13}$ is alkyl containing 1–6 carbon atoms and is more preferred that $R^8$ and $R^{13}$ are methyl; and/or $R^{12}$ and $R^{17}$ are each independently halogen, phenyl, hydrogen, or alkyl containing 1 to 6 carbon atoms, and it is especially preferred that each $R^{12}$ and $R^{17}$ is alkyl containing 1–6 carbon atoms, and it is more preferred that $R^{12}$ and $R^{17}$ are methyl; and/or $R^4$ and $R_5$ are each independently halogen, thioalkyl, hydrogen or alkyl containing 1 to 6 carbon atoms, and it is especially preferred that $R^4$ and $R^5$ are each independently hydrogen or methyl; and/or $R^8$, $R^{10}$, $R^{13}$, $R^{15}$ and $R^{17}$ are hydrogen, and $R^9$, $R^{11}$, $R^{14}$ and $R^{16}$ are hydrocarbyl or substituted hydrocarbyl.

Ligand (I) and the preferred embodiments thereof may be made by any of the procedures described in the previously incorporated references, as well as in WO99/50273 (corresponding to U.S. patent application Ser. No. 09/277,910, filed Mar. 29, 1999) and WO00/08034 (both of which are also incorporated by reference herein for all purposes as if fully set forth). For example, ligand (I) may be made by the reaction of a compound of the formula (VI)

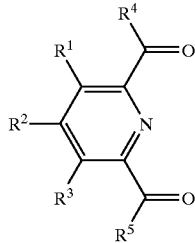

(VI)

with a compound of the formula $H_2NR^6$ or $H_2NR^7$, wherein $R^1$, $R^2$ $R^3$, $R^4$ and $R^5$ are each independently hydrogen, hydrocarbyl, substituted hydrocarbyl or an inert functional group, provided that any two of $R^1$, $R^2$ and $R^3$ vicinal to one another, taken together may form a ring; and $R_6$ and $R^7$ are aryl or substituted aryl. These reactions are often catalyzed by carboxylic acids, such as formic acid.

In the polymerization processes described herein, the iron complex may be added directly as a complex that will polymerize the monomer component, may be added as another complex that may be activated by another compound (catalyst activator) such as an alkylaluminum compound, or may be formed in situ. How to make and/or activate such complexes is found in previously incorporated U.S. Pat. No. 5,955,555, WO99/12981, WO99/46302, WO99/46303, WO99/46304, WO99/46308, WO99/50318, WO99/62963, WO99/62967, WO00/15646, WO00/24788, WO00/32641, WO00/50470, WO99/50273 and WO00/08034, and reference may be had thereto for further details.

"Pure" Fe complexes may be exemplified by the formula (I)FeX$_n$, wherein each X is an anion, n is 1, 2 or 3 so that the total number of negative charges on the X groups is equal to the oxidation state of the Fe in the pure Fe complex. Preferably, each X is a monovalent anion, more preferably selected from the group consisting of a halide and a carboxylate, and especially a halide such as chloride or bromide.

These pure Fe complexes may in and of themselves be active catalysts, or they may be activated (or made more active) preferably by preparation in situ by contact with a catalyst activator in a variety of methods as disclosed in the previously incorporated references. Generally, it has been found that the most active catalysts are those that have been contacted with a catalyst activator.

The monomer component may be polymerized by contacting a first compound W, which is a neutral Lewis acid capable of abstracting $X^-$ to form $WX^-$, with an iron halide complex of ligand (I) (or other $X^-$ complex of (I)), provided that the anion formed is a weakly coordinating anion; or a cationic Lewis or Bronsted acid whose counterion is a weakly coordinating anion.

In those instances in which the Fe complex of (I) does not contain an alkyl, hydride or other group already bonded to the metal (i.e., X is not alkyl or hydride) which may be displaced by a monomer, a neutral Lewis acid or a cationic Lewis or Bronsted acid may also alkylate or add a hydride to the metal, i.e., cause an alkyl group or hydride to become bonded to the metal atom, or a separate compound is added to add the alkyl or hydride group.

A preferred neutral Lewis acid, which can alkylate the metal, is a selected alkyl aluminum compound, such as $R^{20}{}_3Al$, $R^{20}{}_3AlCl$, $R^{20}AlCl_2$, and "$R^{20}AlO$" (alkylaluminoxanes), wherein $R^{20}$ is alkyl containing 1 to 25 carbon atoms, preferably 1 to 4 carbon atoms. Suitable alkyl aluminum compounds include methylaluminoxane (which is an oligomer with the general formula $[MeAlO]_n$), $(C_2H_5)_2AlCl$, $(C_2H_5)AlCl_2$ and $[(CH_3)_2CHCH_2]_3Al$. Metal hydrides such as $NaBH_4$ may be used to bond hydride groups to the transition metal.

In the polymerization processes herein, the temperature at which the copolymerization is carried out is preferably about −100° C. to about +200° C., more preferably about −60° C. to about 150° C., and especially preferably about −50° C. to about 100° C. The copolymerization process may be run in the presence of various liquids, particularly aprotic organic liquids. The catalyst system, and/or monomers and/or polyolefin may be soluble or insoluble in these liquids, but obviously these liquids should not prevent the polymerization from occurring. Suitable liquids include alkanes, cycloalkanes, selected halogenated hydrocarbons, and aromatic hydrocarbons. Specific useful solvents include hexane, toluene and benzene.

The copolymerizations herein may also initially be carried out in the solid state (assuming the complex of (I) is a solid) or by, for instance, supporting the complex on a substrate such as silica or alumina or an organic substrate such as a polymer, activating it with a needed Lewis or Bronsted acid and exposing it to the monomer mixture. The support may also be able to take the place of the Lewis or Bronsted acid, for instance an acidic clay such as montmorillonite. Another method of making a supported catalyst is to start a polymerization or at least make an iron complex of another olefin or oligomer of an olefin such as 1-hexene on a support such as silica or alumina. These "heterogeneous" catalysts may be used to catalyze polymerization in the gas phase or the liquid phase. By gas phase is meant that the monomers are transported to contact with the catalyst particle while they are in the gas phase. Hydrogen may be used as a chain transfer agent in all of the polymerization processes described herein. Other methods and/or preferred methods of carrying out the polymerization are found in previously incorporated U.S. Pat. No. 5,955,555, WO99/12981, WO99/46302, WO99/46303, WO99/46304, WO99/46308, WO99/50318, WO99/62963, WO99/62967, WO00/15646, WO00/24788, WO00/32641 and WO00/50470, and reference may be had thereto for further details.

Other olefin polymerization catalysts, such as metallocene type, Ziegler-Natta type and/or other late transition metal catalysts, may also be present to (co)polymerize some or all of the olefins present. See, for example, previously incorporated WO99/12981, WO99/46302 and WO99/50318, as well as WO98/38228 (which is also incorporated by reference herein for all purposes as if fully set forth).

In all of the polymerization processes described herein oligomers and copolymers of ethylene and diene (and other optional monomers) are made. They may range in molecular weight from oligomers, to lower molecular weight oils and waxes, to higher molecular weight polyolefins. One preferred product is a polymer with a degree of polymerization (DP) of about 10 or more, preferably about 40 or more. By "DP" is meant the average number of repeat (monomer) units in a polymer molecule.

In the diene, it is preferred that:
n is $\geq 0$ (an integer), more preferably n is 1, 2, 3, 4, 6, 8, 10, or 12, and especially preferably n is 2, 3, 4 or 6, and more preferably n is 2 or 4 and/or $R^{19}$ is hydrogen or methyl, more preferably hydrogen. Specific useful dienes include 1,3-butadiene, 1,4-pentadiene, 1,5-hexadiene, 1,6-heptadiene, 1,7-octadiene, 1,9-decadiene, and 1,4-hexadiene. More than one diene may be used in the polymerization, and the resulting polymerization will of course contain repeat units derived from each (see below).

When n is 0 or greater than 4, and/or often when $R^{19}$ is not hydrogen, the diene is polymerized to give repeat unit (III), wherein n is equal to m. When n is 4 or less (but not 0, and usually when $R^{19}$ is hydrogen), some of the diene is incorporated into the polymer as cyclic units, and sometimes it is believed that these cyclic units also include a group derived from ethylene. When n is 4 (diene is 1,7-octadiene), one finds (see below) 1,2-enchained cyclohexane rings in the polymers, that is repeat unit (IV) wherein p is 4. When n is 2 (diene is 1,5-hexadiene), one finds 1,3-enchained cyclopentane rings ((V) in which r is 1) and 1,4-enchained cyclohexane rings ((V) in which r is 2) in the copolymer. Although not wishing to be bound by theory, the enchained cyclohexane and cyclopentane rings are believed to arise from cyclization of the corresponding dienes during the polymerization. The 1,4-enchained cyclohexane rings in the 1,5-hexadiene copolymer are believed to arise from addition polymerization of one end of the 1,5-hexadiene, addition of an ethylene molecule, and then cyclization of the other end of the original 1,5-hexadiene molecule. For 1,4-pentadiene and 1,6-heptadiene cyclic structures are also obtained in the resulting polymers (see the Examples) by what is believed to be similar mechanisms. When m is 4 or more, it is believed that (V) is not present is the polymer (meaning it is not detected by $^{13}C$ NMR as described herein).

An $\alpha$-olefin may optionally be present in the monomer component. In the $\alpha$-olefin it is preferred that $R^{20}$ is methyl or ethyl, more preferably methyl. It is preferred that less than 10 mole percent of the repeat units in the polymer are derived from the $\alpha$-olefin. In another preferred polymer, it is preferred that the $\alpha$-olefin is not present in the polymerization.

Preferably the copolymer of ethylene and diene (and optionally the $\alpha$-olefin) contains about 0.1 to 20 mole percent of incorporated diene, more preferably about 1 to about 10 mole percent, based on the total number of repeat units present derived from ethylene, and the diene and $\alpha$-olefins (if any).

The copolymers described above are useful as molding resins especially as resins which may be crosslinked using methods known in the art, for example, with free radicals or sulfur-type cures, or irradiation. The copolymers prior to crosslinking by one of the above methods are in and of themselves preferably substantially non-crosslinked.

The copolymers may also be functionalized by reaction of the residual unsaturation with a variety of functional reactants in a manner and of a type consistent with that disclosed in the literature. Such functional groups may, for example, be capable of undergoing further reaction, and/or may be capable of imparting desirable properties not otherwise possessed by the base copolymer. Useful such functional groups include, for example, halogen, hydroxyl, amino, amido, carboxyl, acyl and epoxy, and derviatives thereof such as salts, esters, ethers and anhydrides. Potential end uses for such functionalized materials are numerous depending on the type of functionalization and polymer properties. See, for example, U.S. Pat. No. 5,811,379 and U.S. Pat. No. 5,880,241, both of which are incorporated by reference herein for all purposes as if fully set forth.

In the Examples, the following abbreviations are used:
DSC—Differential Scanning Calorimetry
GPC—Gel Permeation Chromatography (in toluene solution)
MeOH—methanol
Mn—number average molecular weight
P—indicates the rest of the polymer chain
PDI—weight average molecular weight/number average molecular weight
PMAO—poly(methylaluminoxane), obtained from Akzo-Nobel, Inc.
PMAO-IP—An improved performance PMAO from Akzo-Nobel, Inc.
TCB—1,2,4-triclhorobenzene
Tm—Melting point (taken as the peak of the melting endotherm)

$^{13}C$ NMR spectra were obtained on a Varian Unity 400 MHz NMR spectrometer or a Bruker Avance® 500 MHz NMR spectrometer using a 10 mm probe on typically 10 wt % solutions of the polymers and 0.05 M Cr(acetylacetonate)$_3$ in 1,2,4-trichlorobenzene (TCB) unlocked at 120° C. using a 90 degree pulse of 16–18 μsec, a spectral width of 30–35 kHz, a relaxation delay of 5 s, an acquisition time of 0.64 sec and gated decoupling. Samples were preheated for at least 15 min before acquiring data. Data acquisition time was typically 10.5 hr. per sample. Spectra are referenced to the solvent TCB high field resonance at 127.914 ppm. A DEPT 135 spectrum was done on most samples to distinguish methyls and methines from methylenes. Methyls were distinguished from methines by chemical shift. Integrals of unique carbons in each structure were measured. These integrals are accurate to +/−5% relative for larger signal and +/−10 or 20% relative for smaller signals. By a "polymer hydrocarbyl branch" is meant a methyl group to a methine or quaternary carbon atom or a group of consecutive methylenes terminated at one end by a methyl group and connected at the other end to a methine or quaternary carbon atom. "EOC" is end-of-chain. Assignments reference to following naming scheme:

1. xBy:By is a branch of length y carbons; x is the carbon being discussed, the methyl at the end of the branch is numbered 1. Thus the second carbon from the end of a butyl branch is 2B4. Branches of length y or greater are designated as y$^+$.

2. The methylenes in the backbone are denoted with Greek letters that determine how far from a methine each methylene is. Thus PPB (beta beta) B denotes the central methylene in the following PCHRCH$_2$CH$_2$CH$_2$CHRP. Methylenes that are three or more carbons from a methine are designated as $\gamma^+$ (gamma$^+$).

When x in xBy is replaced by a M, the methine carbon of that branch is denoted.

2D NMR experiments, including HMQC, HMBC, and HSQC-TOCSY, were used to determine the ring structures in some of the polymers. NMR spectra of model compounds and chemical shift calculations were also used to determine the ring structures found.

In the Examples all pressures are gauge pressures. Irganox® 1010 antioxidant was manufactured by Ciba Specialty Chemicals, CH-4002 Basel, Switzerland. The following compound, (VIII), was used as the iron complex.

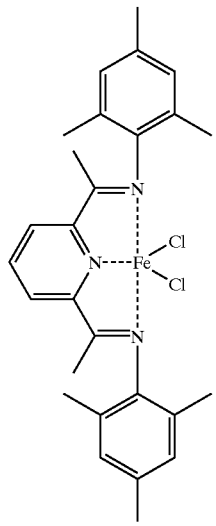

(VIII)

EXAMPLE 1

In a drybox under nitrogen, (VIII) (1.9 mg) was placed in ~8 ml anhydrous toluene in a vial. 1,9-Decadiene (19 ml, filtered through activated $Al_2O_3$ and stored over activated molecular sieves), anhydrous toluene (30 ml) and PMAO (0.7 ml, Akzo, 10.3 wt % Al in toluene) were placed in a Hoke® cylinder and the cylinder closed. The containers were removed from the drybox. The decadiene slurry was placed in a 100 ml Parr® stirred autoclave under $N_2$. Stirring was started and the reactor heated to 41° C. The catalyst solution was added to the reactor with 76 kPa ethylene and this pressure was maintained for the duration of the reaction. After 5 min the reaction was vented and quenched by addition of MeOH. The solid polymer was filtered, washed well with MeOH/10% HCl, MeOH and finally acetone and dried under vacuum. Yield =3.5 g white polymer. DSC (10° C./min., $N_2$); Tm($2^{nd}$ heat)=113.9° C. GPC (135° C., trichlorobenzene); Mn=1820, PDI=4.9. $^{13}$C-NMR analysis indicated a total of 1.8 mol % decadiene incorporation. Only linear C8 olefin ended branches were observed arising from 1,2- or 2,1-insertion of the diene.

EXAMPLE 2

In a drybox under nitrogen, (VIII) (6.0 mg) was placed in a Schlenk flask and anhydrous toluene (10 ml) and 1,9-decadiene (5 ml, filtered through activated $Al_2O_3$ and stored over activated molecular sieves) were added. The flask was sealed and removed from the drybox. It was flushed with ethylene and PMAO-IP (0.9 ml, Akzo, 12.8 wt % Al in toluene) added with vigorous stirring. The reaction was maintained at ~14–35 kPa ethylene for 30 min after which it was quenched by addition of MeOH/10% HCl. The solid polymer was filtered, washed well with MeOH/10% HCl, MeOH and finally acetone with Irganox® 1010 and dried under vacuum. Yield=1.12 g white polymer. DSC (10° C./min., $N_2$); Tm($2^{nd}$ heat)=125.0° C. as well as a broad peak at ~90° C. GPC (135° C., trichlorobenzene); Mn=1460, PDI=15 (bimodal). $^{13}$C-NMR analysis indicated a total of 6.5 mol % decadiene incorporation.

The 400 MHz $^{13}$C NMR spectrum (10 wt./vol. % in TCB at 120° C.)(in part) is given in the following Table.

| ppm | Intensity | Assignment |
|---|---|---|
| 38.381 | 16.6 | |
| 38.009 | 113.6 | $MB_{3+}$ |
| 37.345 | 55.7 | |
| 34.855 | 22.8 | |
| 34.377 | 293.0 | $\alpha\gamma^+$ |
| 33.788 | 235.0 | F |
| 33.060 | 33.1 | $MB_1$ |
| 33.662 | 40.8 | $3B_5$ |
| 32.052 | 52.1 | $3B_{6+}$, 3EOC |
| 31.308 | 18.8 | |
| 30.645 | 44.6 | |
| 30.358 | 235.5 | $\gamma^+ \gamma^+$ |
| 30.151 | 221.9 | $\gamma^+ \gamma^+$ |
| 29.864 | 3487.5 | $\gamma^+ \gamma^+$ |
| 29.333 | 254.6 | $\gamma^+ \gamma^+$ |
| 29.195 | 249.0 | $\gamma^+ \gamma^+$ |
| 27.146 | 259.7 | $\beta\gamma^+$ |
| 24.406 | 11.5 | |
| 22.755 | 43.2 | $2B_{5+}$, 2EOC |
| 19.840 | 31.7 | 1B1 |
| 13.983 | 42.7 | $1B_{4+}$, 1EOC |
| 114.187 | 227.7 | O1 |
| 138.938 | 225.2 | O2 |

Some of the assignments in the above Table are shown in (IX), below.

(IX)

EXAMPLE 3

In a drybox under nitrogen, (VIII) (0.9 mg) was placed in ~5 ml anhydrous toluene in a vial. 1,7-Octadiene (20 ml, filtered through activated $Al_2O_3$ and stored over activated molecular sieves), anhydrous toluene (30 ml) and PMAO (0.5 ml, Akzo, 10.3 wt % Al in toluene) were placed in a Hoke® cylinder and sealed. The containers were removed from the drybox. The octadiene slurry was placed in a 100 ml Parr® stirred autoclave under $N_2$. Stirring was started and the reactor heated to 47° C. The catalyst solution was added to the reactor with 140 kPa ethylene and this pressure was maintained for the duration of the reaction. After 5 min the reaction was vented and quenched by addition of MeOH. The solid polymer was filtered, washed well with MeOH/10% HCl, MeOH and finally acetone and dried under vacuum. Yield=1.52 g white polymer. DSC (10° C./min., $N_2$); Tm($2^{nd}$ heat)=118.8° C. (bimodal). GPC (135° C., TCB); Mn=2970, PDI=3.9. $^{13}$C-NMR analysis indicated a total of 2.6 mol % octadiene incorporation. Of this 2.1% could be attributed to direct 2,1- or 1,2-insertion of the diene and results in an olefin ended branch. The remaining 0.5% was attributed to the diene forming a ring structure by 2,1-insertion followed by 1,2-reincorporation of the olefin ended branch directly after insertion of the diene. The resulting structure is a 6-membered ring with adjacent methines in a trans configuration.

EXAMPLE 4

In a drybox under nitrogen, (VIII) (6.0 mg) was placed in a Schlenk flask and anhydrous toluene (10 ml) and 1,7-octadiene (5 ml, filtered through activated Al$_2$O$_3$ and stored over activated molecular sieves) were added. The flask was sealed and removed from the drybox. It was flushed with ethylene and PMAO-IP (0.9 ml, Akzo, 12.8 wt % Al in toluene) added with vigorous stirring. The reaction was maintained at ~14–35 kPa ethylene for 30 min after which it was quenched by addition of MeOH/10% HCl. The solid polymer was filtered, washed well with MeOH/10% HCl, MeOH and finally acetone with Irganox® 1010 and dried under vacuum. Yield=1.12 g white polymer. DSC (10° C./min., N$_2$); Tm($2^{nd}$ heat)=122.7° C. as well as a broad peak at ~100° C. GPC (135° C., trichlorobenzene); Mn=1050, PDI=3.9. $^{13}$C-NMR analysis indicated a total of 5.6 mol % octadiene incorporation. Of this 3.4% could be attributed to direct 2,1- or 1,2-insertion of the diene and resulted in an olefin-ended branch. 1.5% was attributed to the diene forming a ring structure by 2,1-insertion followed by 1,2-reincorporation of the olefin ended branch directly after insertion of the diene. The resulting structure is a 6-membered ring with adjacent methines in a trans configuration. An additional structure was also observed (0.7%) in which the ring structure was at the end of a chain giving rise to a methyl branch (or chain end).

The 500 MHz 13C NMR spectrum (10 wt./vol. % in TCB at 120° C.)(in part) is given in the following Table.

| Ppm | Intensity | Assignment |
|---|---|---|
| 44.3128 | 0.83 | C |
| 41.8050 | 2.91 | A |
| 38.3705 | 0.44 | |
| 37.9723 | 2.58 | MB$_{3+}$ |
| 37.3252 | 0.71 | |
| 37.1944 | 1.04 | E |
| 36.0803 | 0.97 | |
| 34.3556 | 5.49 | $\alpha\gamma^+$ |
| 34.1659 | 3.34 | $\alpha\gamma^+$ |

-continued

| Ppm | Intensity | Assignment |
|---|---|---|
| 34.0286 | 1.67 | $\alpha\gamma^+$ |
| 33.7805 | 6.37 | F |
| 33.0141 | 0.70 | |
| 32.6645 | 0.61 | |
| 32.2576 | 1.35 | |
| 32.0339 | 5.42 | 3B$_{6+}$, 3EOC |
| 30.3293 | 7.62 | $\gamma^+ \gamma^+$ |
| 29.8470 | 162.27 | $\gamma^+ \gamma^+$ |
| 29.4284 | 4.44 | $\gamma^+ \gamma^+$ |
| 29.1693 | 1.67 | $\gamma^+ \gamma^+$ |
| 27.6638 | 0.86 | $\beta\gamma^+$ |
| 27.1161 | 5.11 | $\beta\gamma^+$ |
| 26.8563 | 3.76 | $\beta\gamma^+$ |
| 26.7310 | 2.94 | $\beta\gamma^+$ |
| 26.6126 | 3.64 | $\beta\gamma^+$ |
| 26.4064 | 3.90 | $\beta\gamma^+$ |
| 22.7373 | 2.05 | 2B$_{5+}$, 2EOC |
| 20.2866 | 0.84 | D |
| 19.8049 | 0.49 | 1$\beta_1$ |
| 13.9652 | 2.06 | 1B$_{4+}$, 1EOC |
| 114.1823 | 4.16 | 01 |
| 138.9342 | 4.22 | 02 |

Some of the assignments in the above Table are shown in (X), below.

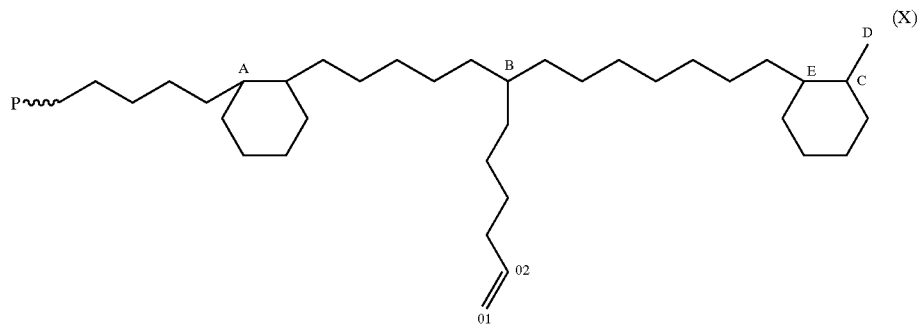

(X)

EXAMPLE 5

In a drybox under nitrogen, (VIII) (2.4 mg) was placed in ~5 ml anhydrous toluene in a vial. 1,5-Hexadiene (30 ml, filtered through activated Al$_2$O$_3$ and stored over activated molecular sieves), anhydrous toluene (20 ml) and PMAO (0.7 ml, Akzo, 10.3 wt % Al in toluene) were placed in a Hoke® cylinder and sealed. The containers were removed from the drybox. The hexadiene slurry was placed in a 100 ml Parr® stirred autoclave under N$_2$. Stirring was started and the reactor heated to 40° C. The catalyst solution was added to the reactor with 76 kPa ethylene and this pressure was maintained for the duration of the reaction. After 10 min the reaction was vented and quenched by addition of MeOH. The solid polymer was filtered, washed well with MeOH/ 10% HCl, MeOH and finally acetone and dried under vacuum. Yield=5.4 g white polymer. DSC (10° C./min., N$_2$); Tm($2^{nd}$ heat)=121.7° C. $^{13}$C NMR analysis indicated a total of 1.8 mol % hexadiene incorporation. Of this 0.3 mol % was due to incorporation of one of the olefins to form olefin ended branches. Two cyclic structures were identified; 2,1 insertion followed by ethylene addition followed by 1,2 insertion (or 1,2 insertion followed by 2,1 insertion) to give a trans 1,4-enchained cyclohexane ring (0.8 mol %) and 2,1 followed by 2,1 (or 1,2 followed by 1,2) to give a trans 1,3-enchained cyclopentane ring (0.7 mol %).

EXAMPLE 6

In a drybox under nitrogen, (VIII) (6.0 mg) was placed in a Schlenk flask and anhydrous toluene (10 ml) and 1,5-hexadiene (5 ml, filtered through activated $Al_2O_3$ and stored over activated molecular sieves) added. The flask was sealed and removed from the drybox. The flask was flushed with ethylene and PMAO-IP (0.9 ml, Akzo, 12.8 wt % Al in toluene) added with vigorous stirring. The reaction was maintained at ~14–35 kPa ethylene for 30 min after which it was quenched by addition of MeOH/10% HCl. The solid polymer was filtered, washed well with MeOH/10% HCl, MeOH and finally acetone with Irganox® 1010 and dried under vacuum. Yield=0.9 g white polymer. DSC (10° C./min., $N_2$); Tm($2^{nd}$ heat)=89.1° C. (broad). $^{13}$C NMR analysis indicated a total of 5.3 mol % hexadiene incorporation. Of this 0.2 mol % was due to incorporation of one of the olefins to form olefin ended branches. Two cyclic structures were identified; 2,1 insertion followed by ethylene addition followed by 1,2 insertion (or 1,2 insertion followed by 2,1 insertion) to give a trans 1,4-enchained cyclohexane ring (2.5 mol %) and 2,1 followed by 2,1 (or 1,2 followed by 1,2) to give a trans 1,3-enchained cyclopentane ring (2.6 mol %).

The 500 MHz $^{13}$C NMR spectrum (10 wt./vol. % in TCB at 120° C.) (in part) is given in the following Table.

| Ppm | Intensity | Assignment |
|---|---|---|
| 40.4383 | 0.55 | |
| 39.1747 | 8.41 | G, T |
| 38.6048 | 0.48 | |
| 38.2648 | 6.94 | A |
| 37.7194 | 6.26 | H |
| 37.5704 | 0.55 | |
| 36.8932 | 6.26 | I |
| 36.3804 | 0.51 | |
| 36.0188 | 0.62 | |
| 35.8194 | 1.82 | |
| 34.9619 | 0.46 | |
| 34.6932 | 1.56 | |
| 34.3415 | 1.61 | |
| 34.2084 | 0.71 | |
| 33.7569 | 15.67 | K |
| 33.3812 | 0.50 | |
| 33.1028 | 7.28 | J |
| 32.9856 | 1.62 | |
| 32.6560 | 0.54 | $3B_5$ |
| 32.0353 | 3.38 | $3B_{6+}$, 3EOC |
| 31.3078 | 0.56 | |
| 31.1691 | 0.74 | |
| 30.6388 | 4.19 | Irganox |

-continued

| Ppm | Intensity | Assignment |
|---|---|---|
| 30.2587 | 7.79 | $\gamma^+ \gamma^+$ |
| 30.1187 | 8.47 | $\gamma^+ \gamma^+$ |
| 29.8426 | 196.90 | $\gamma^+ \gamma^+$ |
| 29.4247 | 6.98 | $\gamma^+ \gamma^+$ |
| 29.3038 | 1.39 | $\gamma^+ \gamma^+$ |
| 29.1639 | 1.23 | $\gamma^+ \gamma^+$ |
| 28.7256 | 5.91 | M |
| 27.6433 | 1.51 | |
| 27.1508 | 6.60 | L |
| 27.0361 | 0.95 | |
| 25.4867 | 1.07 | N |
| 22.7357 | 3.24 | $2B_{5+}$, 2EOC |
| 22.6084 | 0.56 | |
| 13.9623 | 3.34 | $1B_{4+}$, 1EOC |
| 114.1554 | 0.99 | 01 |
| 138.9338 | 0.85 | 02 |

Some of the assignments in the above Table are shown in (XI), below.

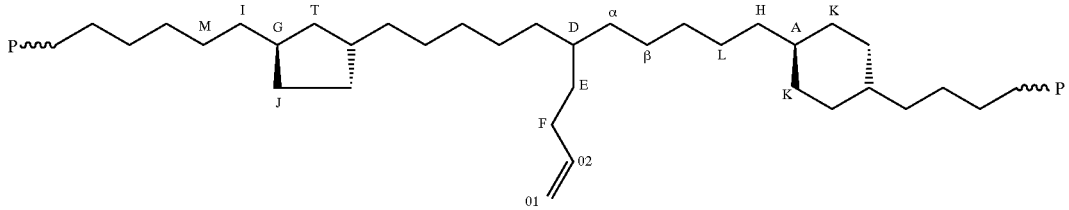

(XI)

EXAMPLE 7

In a drybox under nitrogen, (VIII) (6.0 mg) was placed in a Schlenk flask and anhydrous toluene (10 ml) and 1,6-heptadiene (5 ml, filtered through activated $Al_2O_3$ and stored over activated molecular sieves) were added. The flask was sealed and removed from the drybox. It was flushed with ethylene and PMAO-IP (0.9 ml, Akzo, 12.8 wt % Al in toluene) added with vigorous stirring. The reaction was maintained at ~14–35 kPa ethylene for 30 min after which it was quenched by addition of MeOH/10% HCl. The solid polymer was filtered, washed well with MeOH/10% HCl, MeOH and finally acetone with Irganox® 1010 and dried under vacuum. Yield=1.54 g white polymer. DSC (10° C./min., $N_2$); Tm($2^{nd}$ heat)=124.2° C. as well as a broad peak at ~100° C. GPC (135° C., trichlorobenzene); Mn=1924, PDI=11 (bimodal). $^{13}$C-NMR analysis indicated a total of 2.4 mol % heptadiene incorporation. Only trace amounts of this formed olefin ended branches. Two cyclic structures were identified, a cis-1,2-enchained cyclopentane ring (1.7%) and a cis-1,4-cyclohexane ring structure (0.7%).

EXAMPLE 8

In a drybox under nitrogen, (VIII) (6.0 mg) was placed in a Schlenk flask and anhydrous toluene (10 ml) and 1,4-pentadiene (5 ml, filtered through activated $Al_2O_3$ and stored over activated molecular sieves) were added. The flask was sealed and removed from the drybox. It was flushed with ethylene and PMAO-IP (0.9 ml, Akzo, 12.8 wt % Al in toluene) added with vigorous stirring. The reaction was maintained at ~14–35 kPa ethylene for 30 min after which it was quenched by addition of MeOH/10% HCl. The solid polymer was filtered, washed well with MeOH/10% HCl, MeOH and finally acetone with Irganoxo 1010 and dried under vacuum. Yield =1.10 g white polymer. DSC (10° C./min., N$_2$); Tm($2^{nd}$ heat)=121.9° C. GPC (135° C., trichlorobenzene); Mn=3609, PDI=7 (bimodal). $^{13}$C-NMR analysis indicated a total of 1.2 mol % pentadiene incorporation. Only trace amounts of this formed olefin ended branches. Two cyclic structures were identified, a trans-1, 3-enchained cyclopentane ring (0.9%) and a cis-1,4-cyclohexane ring structure (0.3%)

EXAMPLE 9

In a drybox under nitrogen, (VIII) (6.0 mg) was placed in a Schlenk flask and solution of 1,3-butadiene in anhydrous toluene (20 ml, 5.96 wt % butadiene) was added. The flask was sealed and removed from the drybox. It was flushed with ethylene and PMAO-IP (0.9 ml, Akzo, 12.8 wt % Al in toluene) added with vigorous stirring. The reaction was maintained at ~14–35 kPa ethylene for 30 min after which it was quenched by addition of MeOH/10% HCl. The solid polymer was filtered, washed well with MeOH/10% HCl, MeOH and finally acetone with Irganox® 1010 and dried under vacuum. Yield=1.73 g white polymer. DSC (10° C./min., N$_2$); Tm($2^{nd}$ heat)=101.3° C. as well as a small peak at 121° C. GPC (135° C., trichlorobenzene); Mn=1872, PDI=4. $^{13}$C-NMR analysis indicated a total of 3.7 mol % butadiene incorporation. Of this, 3.3% formed olefin ended branches (incorporation of one of the olefinic groups in the 1,3-butadiene). The remainder (0.4%) appeared to be due to crosslinking where the second olefin end incorporated into a different polymer chain.

EXAMPLE 10

In a drybox under nitrogen, (VIII) (6.0 mg) was placed in a Schlenk flask and anhydrous toluene (10 ml) and 1,4-hexadiene (5 ml, filtered through activated Al$_2$O$_3$ and stored over activated molecular sieves) were added. The flask was sealed and removed from the drybox. It was flushed with ethylene and PMAO-IP (0.9 ml, Akzo, 12.8 wt % Al in toluene) added with vigorous stirring. The reaction was maintained at ~14–35 kPa ethylene for 30 min after which it was quenched by addition of MeOH/10% HCl. The solid polymer was filtered, washed well with MeOH/10% HCT, MeOH and finally acetone with Irganox® 1010 and dried under vacuum. Yield=2.62 g white polymer. DSC (10° C./min., N$_2$); Tm($2^{nd}$ heat)=125.8° C. GPC (135° C., trichlorobenzene); Mn=2043, PDI=11 (bimodal). $^{13}$C-NMR analysis indicated a total of 0.4 mol % hexadiene incorporation. The only branch structure observed was a butyl branch with an internal olefin group. This is consistent with insertion of the alpha-olefin into the polymer chain.

What is claimed is:
1. An olefin copolymer comprising the repeat units:
(a) —CH$_2$CH$_2$—(II);
(b)

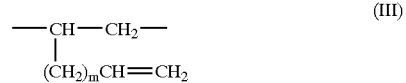

wherein m is 1, 2, 3 or 4; and
(c) (1) when m is 2, 3 or 4, one or more of

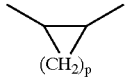

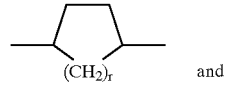

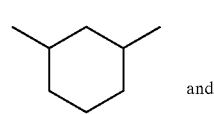

(2) when m is 1, one or more of (V) and (XIII);
wherein:
p is equal to m; and
provided that r is only 1 or 2; and
provided that:
when m is 1 or 2, (V) is present in which r is 1 and r is 2:
when m is 3, (V) is present in which r is 2 and (IV) is present in which p is 3; and
when m is 4, (IV) is present in which p is 4.
2. The olefin copolymer as recited in claim 1, which is derived from the polymerization of a monomer component comprising ethylene and one or more dienes of the formula H$_2$C=CH(CH$_2$)$_n$CH=CH, and n is 1, 2, 3 or 4.
3. The olefin copolymer as recited in claim 1, further comprising one or both of the repeat units

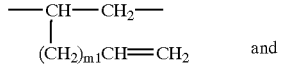

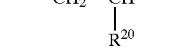

wherein ml is 0 or an integer of from 5 to 28, and R$^{20}$ is an n-alkyl containing 1 to 18 carbon atoms.
4. The copolymer as recited in claim 1, which is substantially non-crosslinked.
5. The copolymer as recited in claim 1 wherein m is 1.
6. The copolymer as recited in claim 1 wherein m is 2.
7. The copolymer as recited in claim 1 wherein m is 3.
8. The copolymer as recited in claim 1 wherein m is 4.

* * * * *